Nov. 28, 1950     S. R. CHRISTIANSEN     2,532,147

LAWN EDGING SPADE ATTACHMENT

Filed April 1, 1946

Inventor
SHIRLEY R. CHRISTIANSEN
By William T. Geier
Attorney

Patented Nov. 28, 1950

2,532,147

UNITED STATES PATENT OFFICE 2,532,147

LAWN EDGING SPADE ATTACHMENT

Shirley Ralph Christiansen, St. Cloud, Minn.

Application April 1, 1946, Serial No. 658,780

2 Claims. (Cl. 97—227)

This invention relates to spade attachments and more particularly to such devices for application to an ordinary spade or bladed digging and cutting implement used in the cutting away and trimming of sod and earth along the edges of walks and other appurtenant similar places coincident with a lawn or other grass plot and the like.

An object of the invention is to improve generally upon devices of its kind and make more practical and convenient the use of the same.

A particular object is to produce an inexpensive device embodying a minimum number of parts, operable in an efficient manner, and readily and adjustably assemblable upon and removable from the spade or digging and cutting tool.

Other objects and advantages to be attained will hereinafter more fully appear in the following description.

A practical but non-limiting exemplification of the invention is illustrated in the accompanying drawing, in which, Figure 1 is a side elevational view of a conventional spade with a simile form of the present invention applied thereto;

Figure 1:
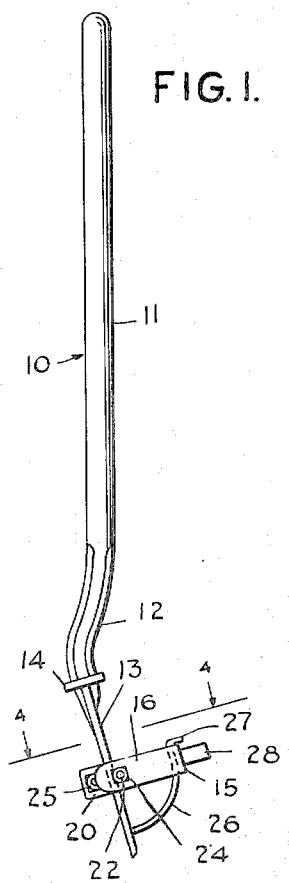

Referring now to the drawing in detail, the numeral 10 designates, as a whole, a conventional spade, although the same may be a specially constructed, bladed digging and cutting implement. The article, as shown, comprises the usual elongated pole-type handle member 11 having the reversely curved lower portion 12 to which is attached a substantially rectangular, plate-like, blade member 13. In the shown structure, the blade 13 extends in a slight angular relation to the handle member 11, but, obviously, in some adaptations of the invention, the implement 10 may be of a known type in which the handle member 11 is straight throughout the entire length thereof and the blade member 13 also extends straightwise longitudinally of the handle member. This being obvious, there is no detail showing of such modification in the drawing.

The particular blade member 13 illustrated in the drawing is provided with a flanged top edge portion 14, the same to afford a substantial widened and flattened surface against which the foot of the user may be pressed in the use of the implement.

As far as the present invention is concerned, the implement 10 may be of an approved and desirable construction and arrangement other than that herein illustrated and above described in detail.

The attachment of the present invention will now be described in detail. As shown, it comprises a substantially U-shaped body yoke 15, the right angular leg members 16, 17, of which are respectively pivotally attached, as at 18, 19, to companion, substantially Z-shape attaching brackets 20, 21, by a through-bolt 22 having a head 23 at one end and a removable retainer nut 24 at its opposite end.

The attaching brackets 20, 21 are provided for securely fastening the attachment of the present invention in different selectably adjusted positions upward and downward, as the case may be, on the blade member 13 of the spade or similar implement 10. As shown, the parallel opposed and outwardly projected, meeting angular end portions of the brackets 20 and 21 are apertured in alinement to receive a securing screw element 25 by the tightening of which the two brackets 20 and 21 are clamped engagingly with the opposite vertical edges of the implement blade 13, as more clearly shown in Figure 4.

Figure 5:
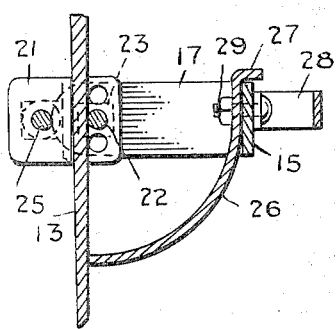
Figure 5 is a cross section on the line 5—5 of Figure 4.
Figure 4:
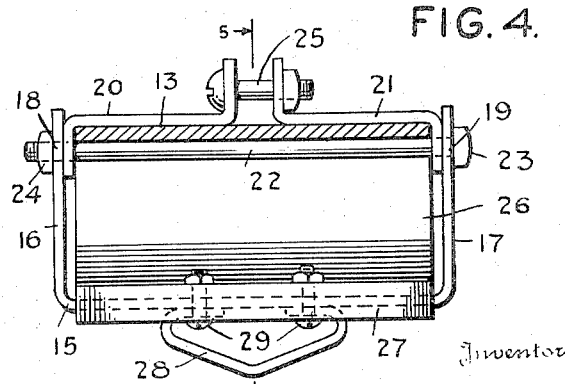
Figure 4 is a sectional view, on an enlarged scale, taken on the line 4—4 of Figure 1.

Welded or otherwise suitably secured to the inner face of the intermediate portion of the body yoke 15 is a downwardly extending arcuate blade member 26, the top edge portion 27 of which is flanged and projected outwardly in overlapping relation to the top edge of the body yoke 15 (see Figures 4 and 5).

As shown more clearly in Figures 4 and 5, a looped strap type handle 28 is secured to the outer face of the intermediate portion of the body yoke 15, the fastening of said handle 28 being effected by a pair of bolts, rivets or screws 29 which are inserted through alined apertures provided therefor in the adjacent portion of the blade element 26 as well as in the body yoke 15 and the end portions of the handle member 28 itself. This particular provision and arrangement affords a stable supporting attachment for the blade element 26 as well as the handle element 28 to the body yoke 15 by a simple, single yet efficient securing means.

In use of the spade attachment as shown in

Figure 2:
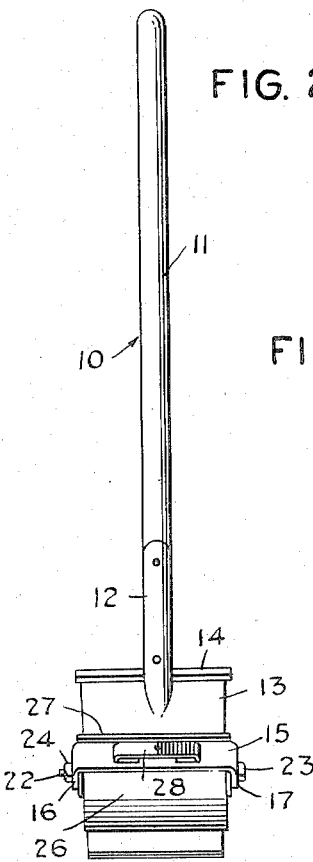
Figure 2 is a front elevational view of the parts shown in Figure 1.

Figures 1 and 2, the attachment tends to gravitate about the axis of the hinge-bolt 22, so that the bottom edge of the arcuate blade element 26 comes to rest against the adjacent outer face portion of the implement blade 13. Then as the handle 11 of the implement is manipulated and the blade member 13 is forced bottom edge into the sod or earth contiguous the edge of walk or the like, the arcuate blade element of the attachment, due to its contact with the adjacent sod or ground, causes the body yoke 15 to swing upwardly about the axis of its hinge-bolt 22 as indicated by dotted lines in Figure 3.

When the implement blade 13 is dug to the desired depth in the sod or earth, the maximum of such depth is limited by the particular position at which the attachment body yoke 15 is set upwardly or downwardly on the implement blade 13. That is to say, the ends of the portions 16 and 17 of the body yoke 15 may strike the sod or ground and thus prevent further movement of the implement blade into the sod or ground. It is because of this happening that provision is made for attaching the attachment of the present invention vertically adjustable on the implement blade.

In further use of the device of the present invention, after the implement blade 13 has made the desired vertical cut into the sod or ground, close to the edge of the walk or the like, the user then presses his foot against the flanged top edge 27 of the pivotally mounted, arcuate, attachment blade 26, thereby forcing said arcuate blade 26 into the adjacent portion of the sod or earth and cutting out a segmental piece of the sod or earth, which latter is retained on the implement blade 13 until said arcuate attachment blade is lifted by the user grasping the handle element 28 or by means of a specially provided manually operable feature to be now described.

Figure 3:
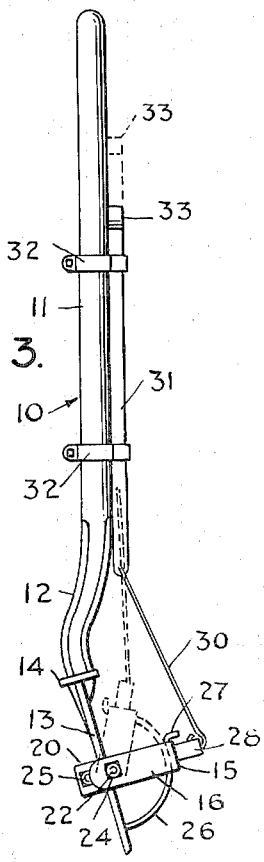
Figure 3 is a view similar to Figure 1 but having applied additionally thereto a manually operable provision for moving the attachment proper to an opened or dumping position.

As indicated in Figure 3, the attachment of the present invention may be modified by pivotally attaching one end portion of a link or a flexible cord element 30 to the said handle element 28 on the body yoke 15, and similarly attaching the opposite end of the link or cord element to the lower end of a pull rod 31 which, as shown, is mounted longitudinally slidable in parallel relation on the handle member 11 of the implement by the provision of detachable supporting and guiding clips 32 which are placed adjustably around adjacent portions of the handle member 11.

The upper end of the pull rod 31, as shown, is provided with a conventional handle 33 for convenience in manipulation of the rod. By pulling upwardly on said rod 31 the attachment of the present invention is lifted from its closed to opened or dumping position.

From the foregoing, it is clearly apparent that a simple and inexpensive yet practical and highly efficient characteristic attachment for spades and similar digging and cutting implements is produced and the same is easily applied to the implement and as readily removed therefrom.

Moreover, while the device of the present invention is designed more particularly for digging and cut-trimming of sod and earth along the edges of walks and the like, the same is adaptable for many other uses. So, too, while the illustrated structure is a practical exemplification of the invention, modification and changes therein are contemplated within the spirit and scope of the appended claims. The invention, therefore, is not limited to the specific construction and arrangement shown.

What is claimed is:

1. In a sod and soil edge trimmer attachment for spade-like implements, a substantially U-shape body yoke pivotally attached at its opposite end portions respectively to each of a pair of bracket elements, said bracket elements having meeting end portions connectible by a tightenable securing element, the outer end portions of said bracket elements being clampingly engaged with the opposite vertical edges of the blade element proper of the implement and at selectively different working positions up and down on said blade element proper edges, the intermediate portion of said body yoke being swingable up and down on the pivotal axis of the yoke body in front of the implement blade element proper, and an arcuate attachment blade element supportedly attached adjacent its upper edge to the intermediate portion of said body yoke, extending downwardly therefrom and curving workably towards the attachment blade element proper, said attachment blade element in its lower position, resting in contact with the adjacent outer face portion of implement blade element proper.

2. A sod and soil edge trimmer attachment as set forth in claim 1, wherein the bracket elements are each of substantially Z-shape, one leg of each bracket element having the correlated end portion of the body yoke pivotally attached thereto by a common through-bolt inserted through alined apertures in the pivotally attached parts and the meeting angular opposite legs of said bracket elements being apertured and joined by a tightening tie element whereby the first mentioned body yoke supporting legs of the bracket elements are clampingly engaged with the opposite vertical edges of the blade element proper of the implement, and the top edge portion of the arcuate attachment blade element is flanged outwardly and supportedly overlapped on the top edge of the intermediate portion of said U-shaped body yoke.

SHIRLEY RALPH CHRISTIANSEN.

REFERENCES CITED

The following references are of record in the file of this patent:

UNITED STATES PATENTS

| Number | Name | Date |
|---|---|---|
| 2,015,109 | Hays | Sept. 24, 1935 |
| 2,348,669 | Winter | May 9, 1944 |